(12) United States Patent
Karpovsky et al.

(10) Patent No.: US 11,477,167 B2
(45) Date of Patent: Oct. 18, 2022

(54) SYSTEMS AND METHODS FOR PERFORMING DYNAMIC FIREWALL RULE EVALUATION

(71) Applicant: MICROSOFT TECHNOLOGY LICENSING, LLC, Redmond, WA (US)

(72) Inventors: Andrey Karpovsky, Haifa (IL); Tomer Rotstein, Haifa (IL); Tomer Levav, Haifa (IL); Ron Matchoro, Herzliya (IL); Michael Makhlevich, Haifa (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 127 days.

(21) Appl. No.: 17/124,261

(22) Filed: Dec. 16, 2020

(65) Prior Publication Data

US 2022/0191173 A1     Jun. 16, 2022

(51) Int. Cl.
*H04L 9/40* (2022.01)

(52) U.S. Cl.
CPC ...... *H04L 63/0263* (2013.01); *H04L 63/0236* (2013.01); *H04L 63/1433* (2013.01)

(58) Field of Classification Search
CPC ............. H04L 63/0263; H04L 63/0236; H04L 63/1433
See application file for complete search history.

(56) References Cited

U.S. PATENT DOCUMENTS

| | | | |
|---|---|---|---|
| 10,237,240 B2 * | 3/2019 | Phillips | H04L 63/0263 |
| 10,348,683 B2 * | 7/2019 | Holla | H04L 63/0236 |
| 10,728,217 B2 * | 7/2020 | Phillips | H04L 63/1433 |
| 2015/0180892 A1 * | 6/2015 | Balderas | H04L 61/4511 726/22 |
| 2015/0195299 A1 * | 7/2015 | Zoldi | H04L 63/1441 726/25 |

(Continued)

FOREIGN PATENT DOCUMENTS

CN     108965337 A     12/2018

OTHER PUBLICATIONS

"International Search Report and Written Opinion Issued in PCT Application No. PCT/US21/058873", dated Feb. 4, 2022, 15 Pages.

*Primary Examiner* — Cheng-Feng Huang
(74) *Attorney, Agent, or Firm* — Newport IP, LLC; Jacob P. Rohwer

(57) ABSTRACT

A firewall rule evaluation service scores firewall rules based on characteristics of logical objects that fall within ranges of Internet Protocol (IP) addresses corresponding to the firewall rules. Firewall rule scoring criteria may cause scores to be assigned to individual firewall rules based on an inverse relationship to quantities of discrete Autonomous Systems as well as aggregate numbers of and/or severity scores for threat intelligence flagged IP addresses granted access by individual firewall rules. The firewall rule evaluation service may further determine firewall rule recommendations for replacing firewall rules spanning multiple IP prefixes for different Autonomous Systems with more narrowly defined firewall rules that precisely encompass IP prefixes corresponding to single autonomous systems or multiple related Autonomous Systems (e.g., Autonomous Systems operated by a single trustworthy entity).

20 Claims, 7 Drawing Sheets

(56) References Cited

U.S. PATENT DOCUMENTS

| | | | |
|---|---|---|---|
| 2018/0026944 A1* | 1/2018 | Phillips | H04L 63/1433 726/4 |
| 2018/0302447 A1 | 10/2018 | Li et al. | |
| 2019/0173845 A1* | 6/2019 | Phillips | H04L 63/0263 |
| 2020/0204574 A1* | 6/2020 | Christian | H04L 63/12 |
| 2020/0329072 A1 | 10/2020 | Dubois et al. | |
| 2021/0014200 A1* | 1/2021 | Phillips | H04L 63/0263 |
| 2021/0400080 A1* | 12/2021 | Kaidi | H04L 63/0281 |

* cited by examiner

SYSTEMS AND METHODS FOR PERFORMING DYNAMIC FIREWALL RULE EVALUATION

BACKGROUND

The present disclosure generally relates to the field of network security and, more particularly, concerns firewall rule evaluation techniques for improving both the precision and manageability of firewall rules.

Firewall rules are commonly defined in the form of ranges of Internet Protocol (IP) addresses that are expressly permitted to access firewall protected computing resources. An integral problem associated with efficiently designing firewall rules is that administrative personnel must strike a balance between the conflicting interests of having tightly defined firewall rules (e.g., rules that are not overinclusive) and also having easily manageable firewall rules. From a purely security standpoint, it would be desirable to have firewall rules that are designed incredibly tightly so as to individually control each IP address that is ever granted or denied access to a firewall protected computing resource. This would be ideal from a security standpoint because such tightly defined rules would render it nearly impossible for malicious entities to gain access to the firewall protected computing resource unless a known resource is compromised.

Unfortunately, real-world practicalities such as the dynamic nature of IP addresses and the inherently limited nature of both human and computing resources renders effectively implementing such tightly defined rules unrealistic. For example, under circumstances where an IP address of an employee's computing device dynamically changes, a previously defined firewall rule which granted access to an IP address that was previously assigned to the computing device would be rendered ineffective at granting access to this particular computing device following the dynamic IP address change. Thus, the employee could be inadvertently denied access to a firewall protected computing resource that is integral to his or her legitimate job responsibilities. As another example, suppose that a server application which requires access to a secure enterprise resource is operating in a virtual machine that is configured to periodically changes its current IP address. Here, unless a new firewall rule were created prior to each periodic IP address change, the virtual machine will at some point be inadvertently denied access. This can result in application failures and costly system downtime.

These and other real-world practicalities typically lead firewall administrators to define very broad firewall rules as continuous ranges of tens or even hundreds of thousands of IP addresses. For example, an administrator may define a firewall rule to broadly cover all IP address associated with some large geographic region surrounding an enterprise campus. While such broadly defined firewall rules are unlikely to inadvertently restrict authorized personnel or server applications from accessing firewall protected computing resources as IP address dynamically change, the clear tradeoff is that such broadly defined firewall rules lack security and overly expose these firewall protected computing resources to potential security threats.

It is with respect to these and other considerations that the disclosure made herein is presented.

SUMMARY

The techniques disclosed herein facilitate a firewall rule evaluation service that scores firewall rules based on numbers of discretely identifiable logical objects that are encompassed within corresponding ranges of Internet Protocol (IP) addresses. Exemplary logical objects that can be identified and used for scoring firewall rules include, inter alia, individual autonomous systems that are associated with discrete aggregations of IP addresses, and individual IP addresses that are flagged within threat intelligence data as being associated with malicious computing activity. Firewall rule scoring criteria may prescribe that rule scores are inversely related to a number of autonomous systems included within a range of IP addresses between a starting IP address ($IP_{start}$) and an ending address IP ($IP_{end}$) defined for individual firewall rules. Since under a variety of circumstances different Autonomous System Numbers (ASNs) are mapped to different owners, in some implementations the firewall rule scoring criteria may prescribe rule scores that are based on a combination of how many ASNs are included within a rule IP address range and a number of discrete ASN owners that are assigned to these different ASNs. For example, a rule that includes an IP address range that covers 10 ASNs and only 2 ASN owners may be assigned a higher score than a rule that also covers 10 ASNs but 10 different ASN owners. Additionally, or alternatively, firewall rule scoring criteria may prescribe that rule scores are inversely related to aggregate numbers of and/or severity scores for threat intelligence flagged IP addresses within the range of IP addresses for individual firewall rules. Accordingly, exemplary firewall rule scoring criteria may prescribe a low (poor) score to a broadly defined firewall rule that indiscriminately grants security access across a large consecutive range of IP prefixes including numerous discretely owned and operated autonomous systems and numerous intelligence flagged IP addresses. In contrast, the exemplary firewall rule scoring criteria may prescribe a high (good) score to a precisely defined firewall rule that grants security access across no more and no less than a full consecutive range of IP prefixes that are assigned to (e.g., by a regional Internet registry) and under the control of a single administrative entity (e.g., a single internet service provider (ISP), a single enterprise campus, etc.) and which includes little or no intelligence flagged IP addresses.

In addition to determining scores for individual firewall rules based on numbers and/or characteristics of logical objects that are discreetly identified as being encompassed therein, the firewall rule evaluation service may further determine firewall rule recommendations for improving the quality of previously defined firewall rules. For example, a firewall rule recommendation may be generated that outlines options for parsing a single low scoring and broadly defined firewall rule into multiple precisely defined firewall rules that precisely encompass (e.g., encompass no more than and no less than) full consecutive ranges of IP addresses corresponding to single autonomous systems. In this way, the firewall rule evaluation service provides firewall administrators with valuable insight as to how to split-up firewall rules that are defined broadly (and somewhat arbitrarily from a security perspective as different autonomous systems present different security issues) into precisely defined firewall rules that are both logically defined and easily manageable from a security perspective. With respect to this point, it makes logical sense from a security perspective to precisely grant or restrict access to a firewall protected resource on an individual autonomous system basis. Ultimately, the evaluation may present the firewall rule scores and/or firewall rule recommendations (or even automatic improvement option) to administrative personnel via a suitable dashboard or portal.

In an exemplary implementation, the firewall rule evaluation service may receive firewall rule data from a customer system. The firewall rule data may define a set of firewall rules that are being implemented to govern access to one or more secured computing resources provided by the customer system. As received from the customer system, the firewall rules may be defined as ranges of IP addresses in decimal format. For example, an individual firewall rule may define an $IP_{start}$ of 148.63.0.0 and an $IP_{end}$ of 148.70.255.255 to grant access to the broad continuous range of IP addresses between and including the $IP_{start}$ and $IP_{end}$. For purposes of the present example, presume that this range of IP addresses has been broadly defined with the intention of covering a specific geographic area to permit employees of an enterprise to access the secured computing resources while working either on-campus or remotely from home or local establishments such as coffee shops etc. Further presume that this range of IP addresses encompasses numerous logical objects which present varying security issues. For example, the range of IP address may span across tens of discretely operated autonomous systems, each implementing their own security protocols—if any at all.

The firewall rule evaluation service may further receive logical object data that defines associations between discrete logical objects and specific IP addresses and/or specific ranges of IP addresses. The logical object data may comprise Autonomous System Number (ASN) data that defines multiple network operators that operate specific groups of IP prefixes (i.e., lists of IP addresses) in accordance with specifically defined routing policies. Due to the varying characteristics of different network operators assigned different ASNs, it should be appreciated that from a security perspective individual ASNs may warrant varying security considerations regarding whether to grant or restrict access. Additionally, or alternatively, the logical object data may comprise Threat Intelligence (TI) data that defines various specific IP addresses that have been flagged as known or suspected malicious entities (e.g., hackers, malware distributers, etc.).

The firewall rule evaluation service identifies discrete logical objects that correspond to individual rules by comparing (e.g., joining) the firewall rule data with the logical object data. In some implementations, the firewall rule evaluation service may convert the firewall rule data and logical object data received in a first format (e.g., decimal format) into a second format (e.g., integer format) that is easily represented along a graphical axis. Referring back to the broadly defined individual firewall rule having the $IP_{start}$ of 148.63.0.0 and the $IP_{end}$ of 148.70.255.255, the firewall rule evaluation service may determine that this broad range of IP address encompasses (wholly or at least partially) tens of discrete IP prefixes assigned in association with different ASNs. The firewall rule evaluation service may further determine that some of the identified discrete IP prefixes include vast numbers of intelligence flagged IP addresses.

Ultimately, the firewall rule evaluation service may determine scores for individual firewall rules based on the amounts of and/or characteristics of the different discrete logical objects identified in association with individual firewall rules. For example, firewall rules having relatively large numbers of associated ASNs and intelligence flagged IP addresses may be assigned relatively lower scores than other firewall rules having fewer associated ASNs and intelligence flagged IP addresses. Furthermore, in some embodiments, the firewall rule evaluation service may determine firewall rule recommendations that outline options for parsing low scoring and broadly defined firewall rules into more precisely defined firewall rules that precisely encompass (e.g., encompass no more than and no less than) full consecutive ranges of IP addresses corresponding to single autonomous systems and/or temporarily blacklist intelligence flagged IP addresses.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses a firewall rule evaluation service that scores firewall rules based on characteristics of logical objects that fall within ranges of Internet Protocol (IP) addresses corresponding to the firewall rules. Firewall rule scoring criteria may cause scores to be assigned to individual firewall rules based on an inverse relationship to quantities of discrete Autonomous Systems as well as aggregate numbers of and/or severity scores for threat intelligence flagged IP addresses granted access by individual firewall rules. For example, firewall rule scoring criteria may result in relatively low scores being assigned to broadly defined firewall rules that grant security access across numerous IP prefixes for different Autonomous Systems while resulting in relatively higher scores being assigned to precisely defined firewall rules that limit granted security access to individual IP prefixes for single Autonomous Systems. Firewall rule scoring criteria may also result in relatively low scores being assigned to firewall rules that grant security access to numerous Threat Intelligence (TI) flagged IP addresses while resulting in relatively higher scores being assigned to firewall rules that granted security access to relatively fewer TI flagged IP addresses. The firewall rule evaluation service may further determine firewall rule recommendations for replacing firewall rules spanning multiple IP prefixes for different Autonomous Systems with more narrowly defined firewall rules that precisely encompass IP prefixes corresponding to single autonomous systems or multiple related Autonomous Systems (e.g., Autonomous Systems operated by a single trustworthy entity).

In this way, the firewall rule evaluation service provides firewall administrators with valuable insight into the quality of existing rules. Furthermore, the firewall rule evaluation service may provide firewall administrators with options for splitting-up firewall rules that are defined broadly, granting access across multiple and potentially unrelated Autonomous Systems, into precisely defined firewall rules that are both logically scoped and easily manageable from a security perspective. With respect to this point, it makes logical sense from a security perspective to grant or restrict access to a firewall protected resource on an individual autonomous system basis. Ultimately, the evaluation may present the firewall rule scores and/or firewall rule recommendations to administrative personnel via a suitable dashboard or portal.

Various examples, scenarios, and aspects of the disclosed techniques are described below with reference to FIGS. 1-5.

Figure 1:
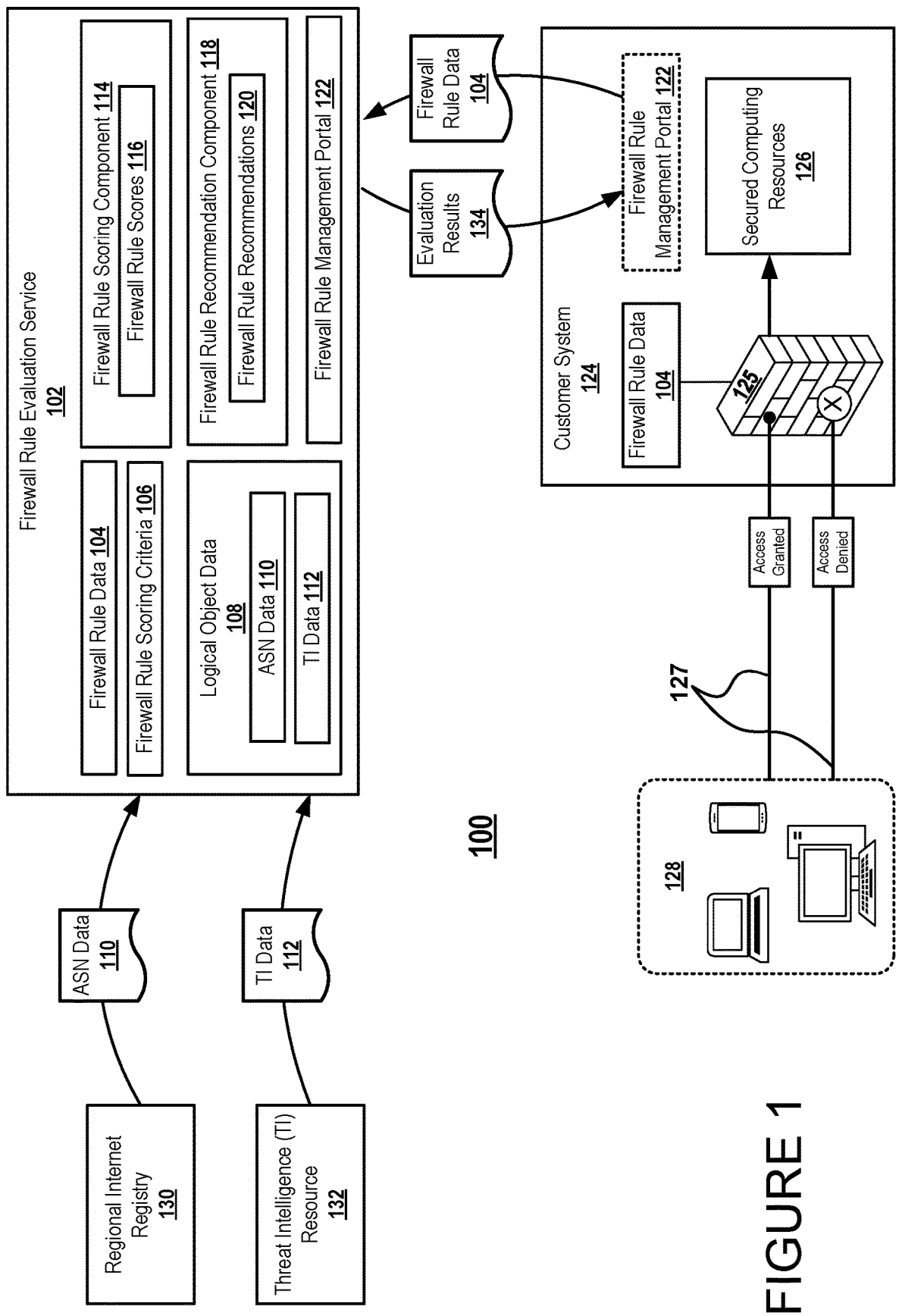
FIG. 1 is a system diagram illustrating an example environment in which a firewall rule evaluation service is configured to score firewall rules based on characteristics of logical objects identified as falling within corresponding ranges of Internet Protocol (IP) addresses.

FIG. 1 is a system diagram illustrating an example environment 100 in which a firewall rule evaluation service 102 is configured to score firewall rules based on characteristics of logical objects identified as falling within corresponding ranges of Internet Protocol (IP) addresses. As illustrated, the firewall rule evaluation service 102 may receive firewall rule data 104 from a customer system 124. The firewall rule data 104 defines a plurality of firewall rules that are designed to govern access to secured computing resources 126 that are provided by the customer system 124. Specifically, a networking firewall 125 receives network traffic 127 from various client devices 128 that are attempting to access the secured computing resources 126. As illustrated, the network firewall 125 implements the firewall rules as defined in the firewall rule data 104 to grant or deny individual client devices 128 access to the secured computing resources 126.

The firewall rule evaluation system 102 receives the firewall rule data 104 from the customer system 124. As received from the customer system 124, the firewall rules may be defined as ranges of IP addresses in decimal format. For example, an individual firewall rule may define an $IP_{start}$ of 148.63.0.0 and an $IP_{end}$ of 148.70.255.255 to grant access to the broad continuous range of IP addresses between and including the $IP_{start}$ and $IP_{end}$. Firewall rules are often defined broadly in this manner with the intention of covering a specific geographic area(s). For example, an individual firewall rule may define a range of IP addresses that is inclusive of both an enterprise campus and a wide geographic area surrounding the enterprise campus so as to permit employees of a business enterprise to access the secured computing resources while working either on-campus or remotely within the wide geographic area surrounding the enterprise campus. As described herein, such broadly defines rules may indiscriminately permit access across a range of IP addresses that encompasses numerous logical objects. Since individual ones of these different logical objects (e.g., Autonomous Systems, TI flagged IP addresses) present their own unique security profile, it may not make sense from a security standpoint for individual firewall rules to permit access to multiple different logical objects. For example, the range of IP address may span across tens of discretely operated autonomous systems, each implementing their own security protocols—if any at all. Some of these autonomous systems may implement strict security protocols and be highly trustworthy whereas others may implement lax security protocols and be rife with security risks.

The firewall rule evaluation service 102 further receives logical object data 108 that defines associations between discrete logical objects and specific IP addresses and/or specific ranges of IP addresses. As illustrated, the logical object data 108 may include Autonomous System Number (ASN) data 110 that defines multiple network operators that operate specific groups of IP prefixes (i.e., lists of IP addresses) in accordance with specifically defined routing policies. The ASN data 110 may be received from one or more Regional Internet Registries 130 that manage the allocation and registration of IP addresses and ASNs within a specific geographical region of the world. For example, the firewall rule evaluation service 102 may receive a portion of the ASN data 110 from the American Registry for Internet Numbers (ARIN) and some other portion of the ASN data 110 from the African Network Information Center (AFRINIC). Exemplary ASN data 110 may be in the form of lists of Autonomous System Numbers (ASNs) that have been assigned by the Regional Internet Registry 130 in addition to ranges of IP address that correspond to each one of the individually assigned ASNs. Additionally, or alternatively, the ASN data 110 may be received, in part or in whole, from one or more Local Internet Registries (LIRs) which may be, for example, Internet Service Providers (ISPs), business enterprises, or academic institutions. Due to the varying characteristics of different network operators assigned different ASNs, it should be appreciated that from a security perspective individual ASNs may warrant varying security considerations regarding whether to grant or restrict access.

As illustrated, the logical object data 108 may further comprise Threat Intelligence (TI) data 112 that is received periodically from one or more TI Resources 132. Exemplary TI data 112 may define specific IP addresses that have been flagged as being associated with known or suspected malicious entities (e.g., hackers, malware distributors, etc.). The TI data 112 may be comprised of IP reputation data that is generated by analyzing network activity (e.g., search queries, resource requests, etc.) from a variety of global industries such as financial institutions, streaming content distributors, healthcare providers, and government services. Based on the analyzed network activity, the TI Resource 132 may identify individual IP addresses as presenting some form of a security threat such as, for example, a fraud risk. For example, the TI Resource 132 may determine that a particular IP address is currently associated with a malicious bot that is designed to steal sensitive information (e.g., financial information, Social Security Numbers, etc.) to infect a host computing system (and therefore potentially the secured computing resources 126 if inadvertently granted access thereto). The TI data 112 may define poor IP reputations for individual IP addresses that are recently observed as engaging in suspicious behavior. Additionally, or alternatively, the TI data 112 may define poor IP reputations for known proxy and/or VPN IP addresses that allow anonymized connections to be tunneled therethrough since such IP addresses often attract malicious actors such as cybercriminals wishing to conceal their identities while committing fraudulent or abusive online behavior.

In some implementations, the firewall rule evaluation service 102 may convert the firewall rule data 104 and logical object data 108 into a desired format such as, for example, integer format to facilitate joining of the data sets. Under some circumstances, the firewall rule data 104 and/or logical object data 108 may be received in decimal format in which multiple octets are separated by decimals. As a specific but nonlimiting example, an individual firewall rule may be defined in the form of an $IP_{start}$ of 148.63.0.0 and an $IP_{end}$ of 148.70.255.255. With specific reference to the $IP_{start}$, it will be appreciated that this decimal format IP address has a first octet of "148," a second octet of "63," a third octet of "0," and a fourth octet of "0." As such, this specific $IP_{start}$ may be converted into integer format based on equation 1 as follows:

$$\text{Integer} = (148*256^3) + (63*256^2) + (0*256^1) + (0*256^0) \quad \text{(Equation 1)}$$

Based on equation 1, the $IP_{start}$ of 148.63.0.0 can be converted into the integer 2487156736. As described and shown in relation to FIGS. 2A through 3B, converting the firewall rule data 104 and/or logical object data 108 into integer form is useful since this integer form is easily represented along a graphical axis.

The firewall rule evaluation service 102 may then join the logical object data 108 with the firewall rule data 104 to identify discrete logical objects that correspond to individual firewall rules. For example, by joining the firewall rule data 104 with the ASN data 110 (each of which may have been converted to integer form as described above), the firewall rule evaluation service 102 may determine that an individual firewall rule having a corresponding $IP_{start}$ and $IP_{end}$ wholly or partially encompasses ten discrete IP prefixes—each of which is assigned by a Regional Internet Registry (RIR) in association with different ASNs. Additionally, or alternatively, by joining the firewall rule data 104 with the TI data 112, the firewall rule evaluation service 102 may determine that the individual firewall rule having the corresponding $IP_{start}$ and $IP_{end}$ includes ten intelligence flagged IP addresses.

Then, based on the discrete logical objects identified as corresponding to individual firewall rules, a firewall rule scoring component 114 of the firewall rule evaluation service 102 applies firewall rule scoring criteria 106 to generate firewall rule scores 116. The firewall rule scoring component 114 may determine scores for individual firewall rules based on the amounts of and/or characteristics of the different discrete logical objects identified in association with the individual firewall rules. For example, firewall rules having broad IP ranges that span across relatively large numbers of associated ASNs and intelligence flagged IP addresses may be assigned relatively lower scores than other firewall rules having fewer associated ASNs and intelligence flagged IP addresses.

The firewall rule scoring criteria 106 may cause the firewall rule scoring component 114 to assign firewall rule scores 116 according to an inverse relationship to a number of autonomous systems included within a range of IP addresses between a starting IP address ($IP_{start}$) and an ending address IP ($IP_{end}$) defined for individual firewall rules. Additionally, or alternatively, the firewall rule scoring criteria 106 may cause the firewall rule scoring component 114 to assign firewall rule scores 116 according to an inverse relationship to an aggregate number of and/or severity scores for threat intelligence flagged IP addresses within the range of IP addresses for individual firewall rules. Based on the foregoing inverse relationships, firewall rule scoring criteria 106 result in a low (poor) score being assigned to a broadly defined firewall rule that indiscriminately grants security access across a large consecutive range of IP prefixes including numerous discretely owned and operated autonomous systems and numerous intelligence flagged IP addresses. In contrast, the foregoing inverse relationships may result in a high (good) score being assigned to a precisely defined firewall rule that grants security access across no more and no less than a full consecutive range of IP prefixes that are assigned to (e.g., by a regional Internet registry) and under the control of a single administrative entity (e.g., a single internet service provider (ISP), a single enterprise campus, etc.) and which includes little or no intelligence flagged IP addresses.

In some embodiments, a firewall rule recommendation component 118 may generate firewall rule recommendations 120 that define one or more options for improving the quality of one or more individual firewall rules. An exemplary firewall rule recommendation 118 may outline specific options for replacing an individual firewall rule that has received a low score due to being broadly defined and encompassing IP prefixes for multiple ASNs. The specific options may include multiple precisely defined firewall rules that precisely encompass (e.g., encompass no more than and no less than) full consecutive ranges of IP addresses corresponding to single autonomous systems and/or logically related autonomous systems (e.g., two autonomous systems that are operated by the same business enterprise and implement similar security protocols).

In some embodiments, the firewall rule evaluation service 102 may expose a firewall rule management portal 122 to the customer system 124 to communicate evaluation results 134 to firewall administrative personnel associated with the customer system 124. The evaluation results 134 may include both the firewall rule scores 116 and the firewall rule recommendations 120. The firewall rule management portal 122 may enable the firewall administrative personnel to accept or deny the firewall rule recommendations 120. The firewall rule management portal 122 may enable the firewall administrative personnel to accept or deny individual firewall rule recommendations 120. Upon receiving an indication that the firewall administrative personnel has accepted an individual firewall rule recommendation 120, the firewall rule evaluation service 102 may automatically update the firewall rule data 104 and provide the "updated" firewall rule data 104 back to the customer system 124 which may then begin implementing the firewall rules which have been updated based on the accepted firewall rule recommendation 120.

Figure 2A:
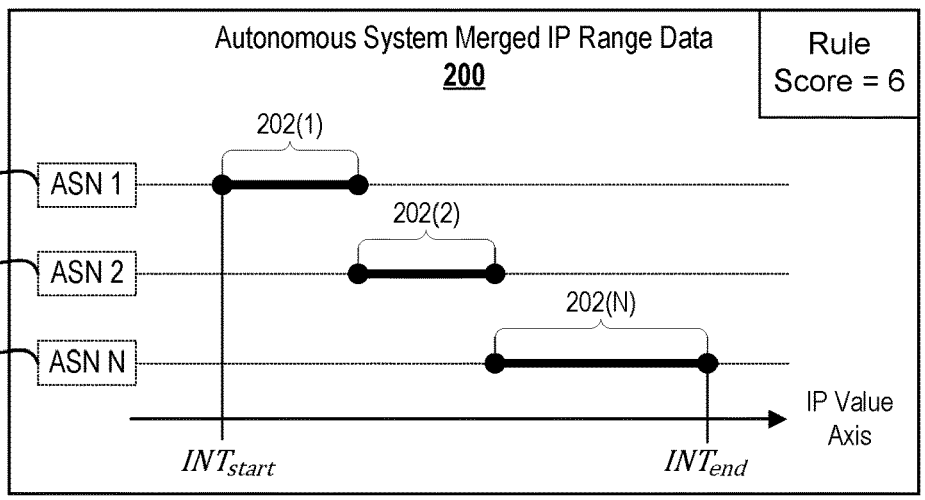
FIG. 2A illustrates exemplary Autonomous System Merged IP Range Data that is generated by joining firewall rule data and ASN data in accordance with the techniques described herein.

Turning now to FIG. 2A, illustrated is exemplary Autonomous System Merged IP Range Data 200 that is generated by joining firewall rule data 104 and ASN data 110 in accordance with the techniques described herein. Here, the Autonomous System Merged IP Range Data 200 corresponds to an individual firewall rule that defines a starting IP address ($IP_{start}$) and an ending address IP ($IP_{end}$) for a range of allowable IP addresses from which network traffic 127 can access the secured computing resources 126. Furthermore, the Autonomous System Merged IP Range Data 200 indicates a number of ASNs that are included (wholly or partially) within the range of allowable IP addresses for the individual firewall rule.

As described above, in some implementations, the firewall rule evaluation service 102 may convert each of the firewall rule data 104 and the ASN data 110 into integer format to facilitate joining of the data sets. For example, as illustrated, the firewall rule data 104 includes starting and ending IP addresses in standard IPv4 format (e.g., 162.15.22.255) for each of multiple individual rules and an indication of whether to allow or block network traffic within the corresponding range. To facilitate the joining of these data sets into a format that is readily representable along a graphical axis, the firewall rule evaluation service 102 may convert the starting and ending IP addresses from the standard IPv4 format (or whatever format they are received in) into integer format as shown in FIG. 2A. For example, referring specifically to the starting IP and ending IP of the first firewall rule (i.e., FW Rule 1), the IPv4 decimal format addresses of 148.63.0.0 and 148.70.255.255 are converted into the starting integer and ending integers of 2487156736 and 2487681023, respectively. Similarly, referring specifically to the ASN 65515 which has been assigned for use in managing networking activity associated with Contoso Public Cloud, the IPv4 decimal format addresses of 148.63.0.0 and 148.63.100.12 are converted into the starting integer and ending integers of 2487156736 and 2487182348, respectively.

As illustrated, the Autonomous System Merged IP Range Data 200 may be represented in graphical form with an Integer Start ($INT_{start}$) and an Integer End ($INT_{end}$) represented along an IP Value axis. Here, the $INT_{start}$ and an $INT_{end}$ represents the range of IP addresses of a particular firewall rule. In the illustrated graphical form, Autonomous System Merged IP Range Data 200 clearly indicates that the range of IP addresses for this particular firewall rule spans across numerous different IP prefixes 202 that each uniquely correspond to corresponding ASNs 204. Specifically, as illustrated a first IP prefix 202(1) represents a specific range of IP addresses that has been assigned to a first ASN 204(1), a second IP prefix 202(2) represents another specific range of IP addresses that has been assigned to a second ASN 204(2), and an Nth IP prefix 202(N) represents yet another specific range of IP addresses that has been assigned to an Nth ASN 204(N).

The Autonomous System Merged IP Range Data 200 may further indicate a rule score that is determined for the particular firewall rule based on the number of ASNs 204 having IP prefixes 202 that fall within the range of IP addresses between the range of IP addresses spanning from the $INT_{start}$ to the $INT_{end}$. For example, the rule score of 6 as shown in FIG. 2 may be determined based on the particular firewall rule spanning the N different ASNs 204. If the particular firewall rule were to have range of IP addresses that precisely encompassed only the first IP prefix 202(1), then this could serve as a relevant factor for assigning a relatively higher score to the particular firewall rule. In contrast, if the particular firewall rule which you have a range of IP addresses that more broadly encompassed greater than N IP prefixes 202, then this could serve as a relevant factor for assigning a relatively lower score to the particular firewall rule. Stated plainly, the determination of the rule score for a particular firewall rule may be inversely related to the number of IP prefixes 202 that correspond to different ASNs 204 that fall within the range of IP addresses corresponding to the particular firewall rule.

Figure 2B:
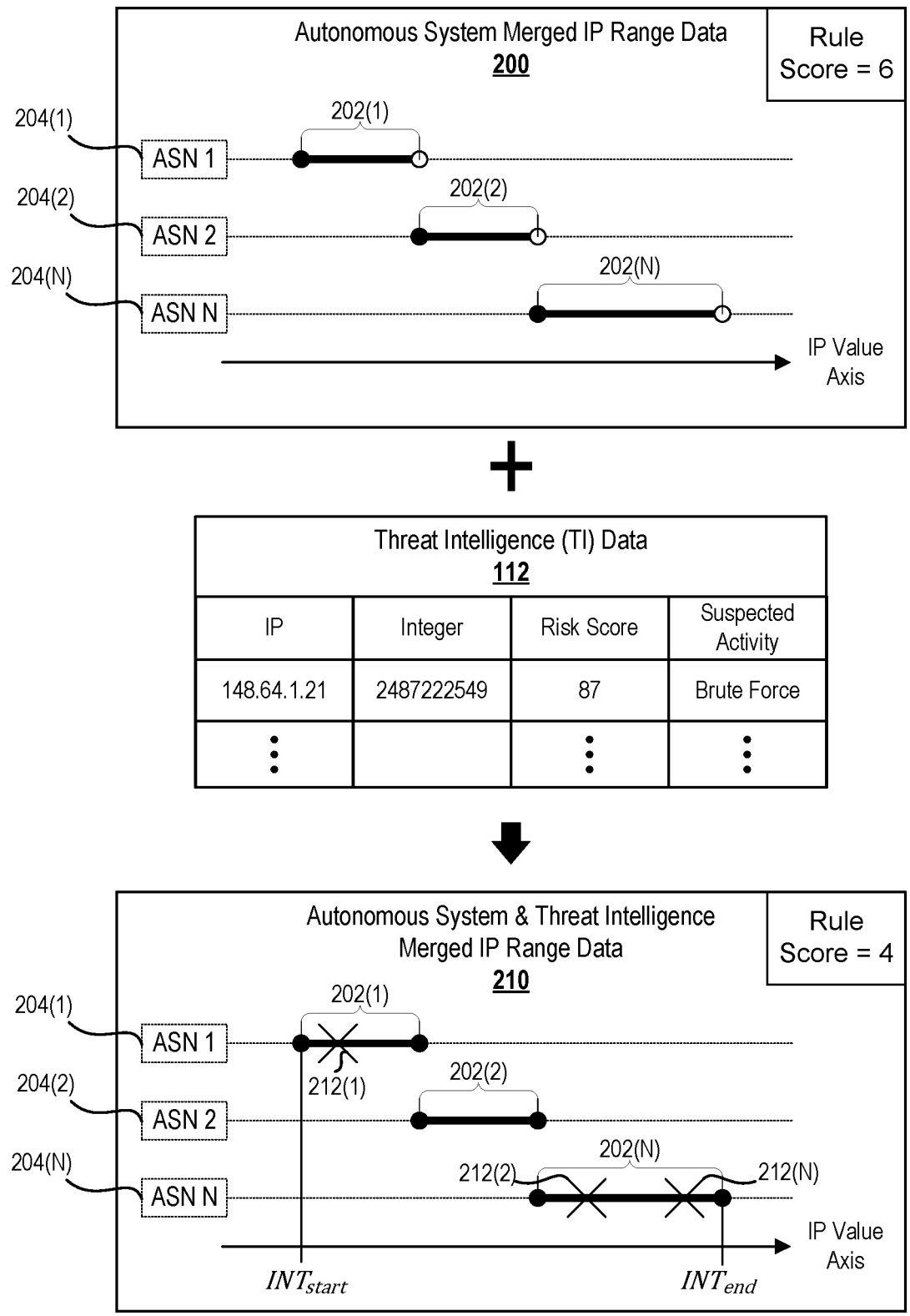
FIG. 2B illustrates exemplary Autonomous System & Threat Intelligence Merged IP Range Data that is generated by joining the Autonomous System Merged IP Range Data of FIG. 2A with exemplary TI data.

Turning now to FIG. 2B, illustrated is exemplary Autonomous System & Threat Intelligence Merged IP Range Data 210 that is generated by joining the Autonomous System Merged IP Range Data 200 described in relation to FIG. 2A with exemplary TI data 112. As illustrated, the TI data 112 may include indications of specific IP addresses that have been flagged in association with certain suspected activities. For example, as illustrated, the specific IP address of 148.64.1.21 has been flagged in association with suspected brute force activity. Furthermore, the specific IP address of 148.64.1.21 has been assigned a risk score of 87 indicating that networking traffic 127 received from this specific IP address presents a high security risk.

As illustrated, the Autonomous System & Threat Intelligence Merged IP Range Data 210 includes the same information in graphical form as the Autonomous System Merged IP Range Data 200 but further includes security threat indications 212 corresponding to specific IP addresses that have been flagged within the TI data 112. Here, the addition of the TI data 112 graphically communicates that specific IP addresses that are operated by the first ASN 204(1) and the Nth ASN 204(N) have been flagged within the TI data 112 as representing potential security threats. Furthermore, the Autonomous System & Threat Intelligence Merged IP Range Data 210 also indicates that the second ASN 204(2) is operating an IP prefix 202(2) that is clean in that sense that it does not include any specific IP addresses that have been flagged within the TI data 112 as representing potential security threats.

As described above, in some implementations the firewall rule scoring criteria 106 may prescribe rule scoring that is inversely related to a number of potential security threats that are indicated within the TI data 112 as being within the permitted IP address range of any particular firewall rule. As such, as FIG. 2B represents that the rule score determined based on the joining of the ANS data 110 with the firewall rule data 104 (as shown in FIG. 2A) may be further adjusted downward due to the presence of these potential security. For example, in the immediate example, the rule score of 6 that was initially determined based on the particular firewall rule spanning the N different ASNs 204 has been adjusted downward to 4 due to the N different potential security threats being identified within the range of IP addresses for this particular rule.

Figure 3A:
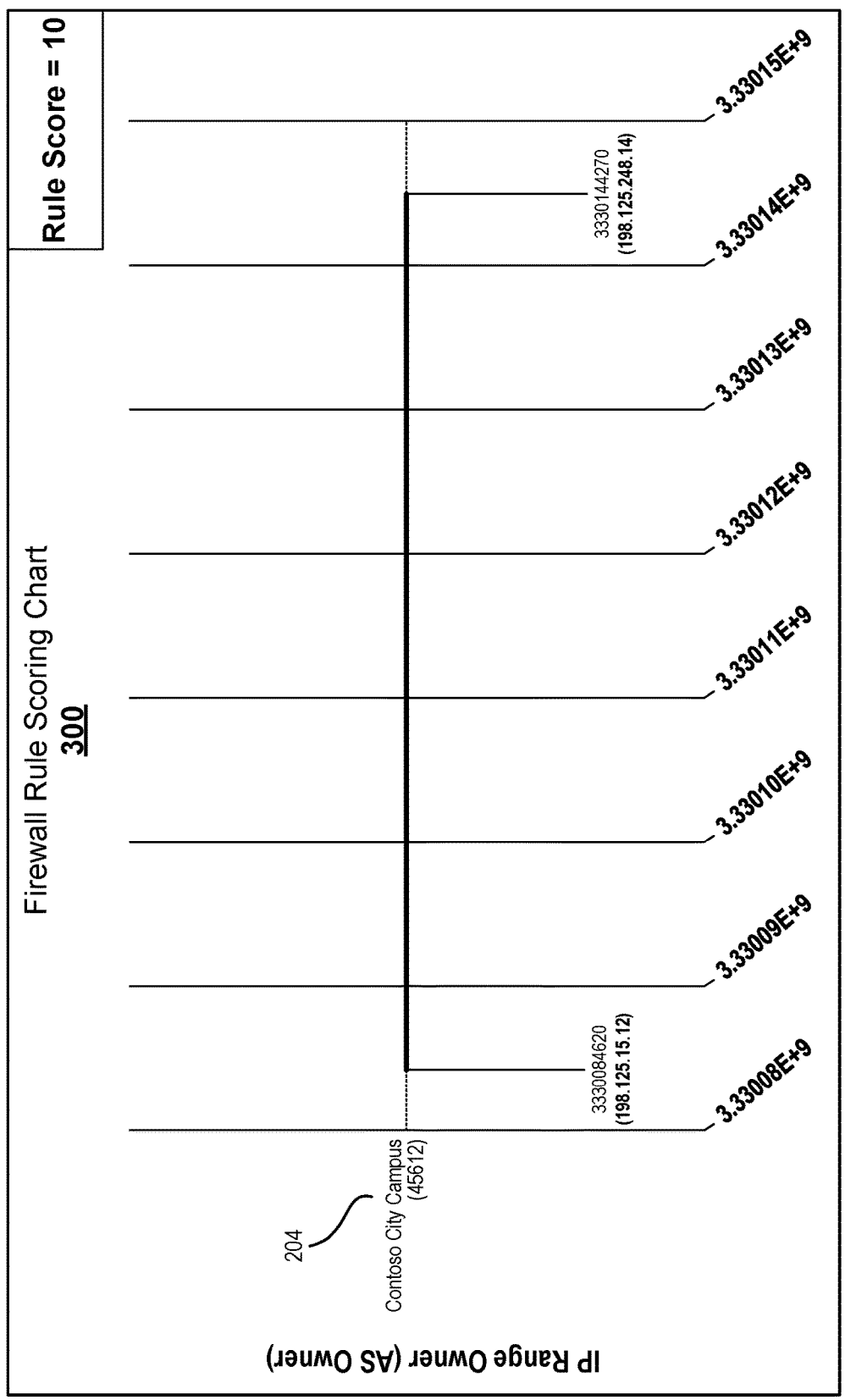
FIG. 3A illustrates an exemplary firewall rule scoring chart for a firewall rule that defines an IP address range that precisely encompasses a full range of IP addresses that are operated by a single Autonomous System Number (ASN) and no IP address outside of this full range operated by the single ASN.

FIG. 3A illustrates an exemplary firewall rule scoring chart 300 associated with an individual firewall rule having a corresponding IP address range that is precisely defined to encompass IP addresses that are operated by a single ASN 204. For purposes of FIG. 3A, presume that the firewall rule defines an $IP_{start}$ of 198.125.15.12 and an $IP_{end}$ of 198.125.248.14. Accordingly, the firewall rule evaluation service 102 may convert the $IP_{start}$ and the $IP_{end}$ to an $INT_{start}$ of 3330084620 and an $INT_{end}$ of 3330144270, respectively.

The exemplary firewall rule scoring chart 300 graphically indicates that only a single ASN 204 (e.g., the ASN of 45612 assigned to Contoso City Campus) operates an IP prefix that is included within the individual firewall rule. As this represents the lowest possible number of ASNs 204 that could be encompassed by a functional firewall rule, this may serve as a factor leading towards a high rule score being assigned to the individual firewall rule. Furthermore, the exemplary firewall rule scoring chart 300 does not include any security threat indications 212 and, therefore, graphically indicates that there are no specific IP addresses that have been flagged within the TI data 112 as falling within the IP addresses encompassed by the individual firewall rule. This lack of known IP threats being encompassed within the individual firewall rule may also serve as a factor leading towards a high rule score being assigned to the individual firewall rule. Accordingly, the exemplary firewall rule scoring chart 300 indicates that a rule score of 10 has been assigned to the individual firewall rule.

Figure 3B:
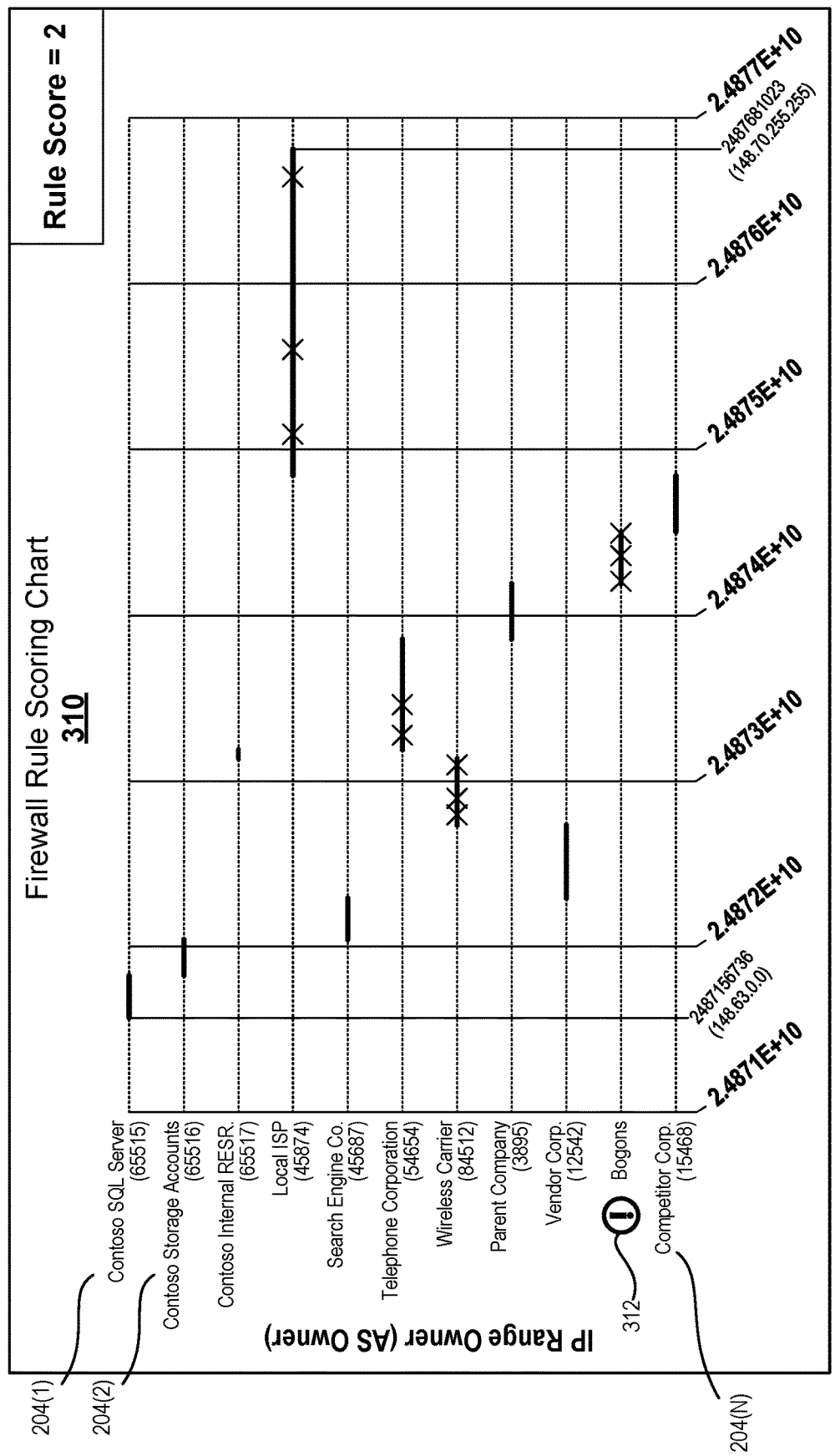
FIG. 3B illustrates an exemplary firewall rule scoring chart associated with a different firewall rule having a corresponding IP address range that is broadly defined to encompass IP addresses that are operated in association with numerous different ASNs.

In contrast to FIG. 3A, FIG. 3B illustrates an exemplary firewall rule scoring chart 310 associated with a different firewall rule having a corresponding IP address range that is broadly defined to encompass IP addresses that are operated in association with numerous different ASNs 204. Since different ASNs 204 are likely to present different security issues, the fact that the firewall rule associated with the firewall rule scoring chart 310 grants access across a wide range of IP addresses that encompasses numerous different ASNs 204 serves as a factor leading towards lowering the particular rule score being assigned to the this firewall rule. For example, in contrast to the rule score of "10" that was assigned to the firewall rule represented in the firewall rule scoring chart 300, the relatively larger number of ASNs spanned by the allowed IP range of the firewall rule represented in the firewall rule scoring chart 310 leads to the relatively lower rule score of "2."

In some implementations, the firewall rule evaluation service 102 may identify whether an IP address range for a particular rule encompasses areas of IP address space that have been reserved and/or have not been allocated or delegated for use by an authoritative body such as a Regional Internet Registry 130 or an Internet Assigned Numbers Authority. For example, as shown in FIG. 3B, the firewall rule scoring chart 310 includes a warning symbol 312 that is displayed in association with a range of unallocated address space (e.g., bogon space) or address space that is reserved for special-use by, for example, the Internet Assigned Numbers Authority (IANA). In some implementations, a particular rule having an IP address range that encompasses reserved and/or unallocated IP address space may serve as a factor leading towards a low rule score being assigned to this particular firewall rule.

In some implementations, the firewall rule evaluation service 102 may identify characteristics of one or more ASNs identified as being encompassed within a particular firewall rule. Ultimately, these identified characteristics can serve as factors in determining the rule score to be assigned to the particular firewall rule.

As a specific example, the firewall rule evaluation service 102 may identify that one or more ASNs across which an individual firewall rule spans are assigned to a similar or common entity. For example, as shown in FIG. 3B, each of the ASNs of 65515, 65516, and 65517 are assigned to the same business enterprise (e.g., Contoso) but are used by the business enterprise for different purposes. However, from a security perspective it may make sense to treat view each of these three ASNs similarly (e.g., since the business entity is likely implementing similar security measures across). Accordingly, the firewall rule evaluation service 102 may determine a rule score for the firewall rule of FIG. 3B based on a determination that two more of the ASNs are operated by a common entity. Additionally, or alternatively, the firewall rule evaluation service 102 may determine a rule score for an individual firewall rule based on some other identifiable characteristic that two or more ASNs or corresponding Autonomous Systems have in common with one another. In some implementations, a determination that one or more firewall rules span multiple different ASNs that are commonly owned (e.g., assigned to the same entity or related entities) may result in a firewall rule recommendations being generated that recommends generation of a firewall rule that allows access to multiple IP prefixes that correspond to multiple commonly owned ASNs.

As another specific example, the firewall rule evaluation service 102 may identify that one or more ASNs across which an individual firewall rule spans are assigned to a competitor entity. Such a determination may serve as a factor towards prescribing a lower rule score to a particular firewall rule. For example, as illustrated, the firewall rule that is graphically represented in the firewall rule scoring chart 310 permits an IP prefix that corresponds to an ASN (15468) that is assigned to and therefore operated by a competitor (e.g., Competitor Corp.). The characteristic of this ASN being assigned to a known competitor may serve a factor that leads towards lowering the rule score assigned. Furthermore, this characteristic may also lead to generation of a firewall rule recommendation that parses this illustrated firewall rule into one or more recommended firewall rules that do not grant access to the range of IP addresses that correspond to any ASNs that are assigned to competing entities.

As illustrated in FIG. 3B, in some implementations the firewall rule scoring charts may graphically represent various characteristics of the subset or specific group of Autonomous Systems that are identified as having the individual ASN IP address ranges that are at least partially encompassed within the firewall rule IP address range for the relevant firewall rule. Exemplary such characteristics may include, for example, an ASN that is assigned in association with the individual ASN IP address ranges (e.g., 65515), an entity name to which the particular ASN is assigned (e.g., Contoso SQL Server), indications of how many IP addresses within any individual ASN IP address range have been flagged within TI data, and so on. In the specifically illustrated example, the firewall rule scoring chart includes: a first axis along which individual ASN ownerships are indicated for the individual Autonomous Systems (the vertical axis as illustrated), and a second axis along which the individual ASN IP address ranges are indicated in association with the individual ASN ownerships (the horizontal axis as illustrated).

Figure 4:
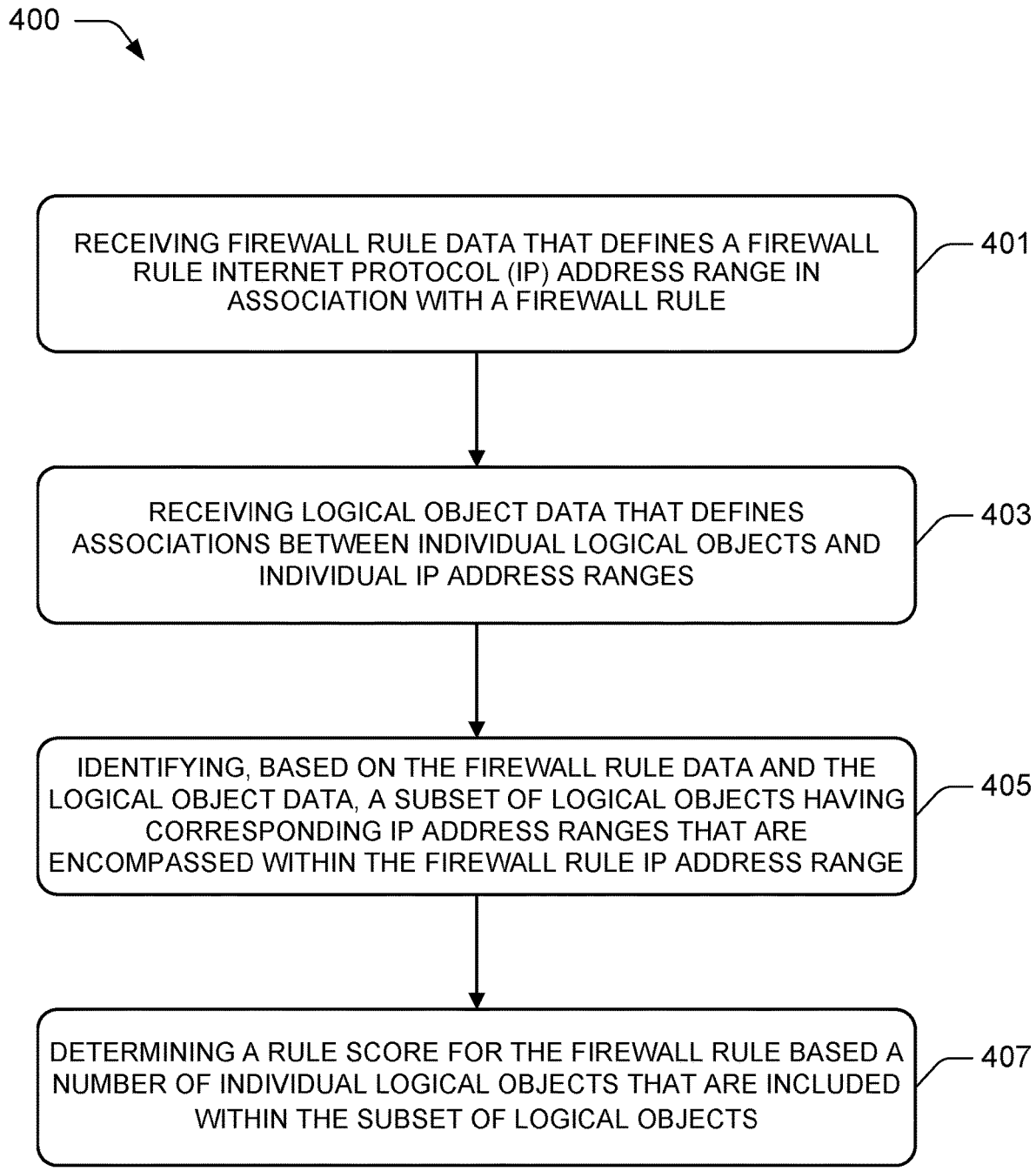
FIG. 4 illustrates a process that facilitates generating scores for firewall rules based on numbers of discretely identifiable logical objects that are encompassed within corresponding ranges of Internet Protocol (IP) addresses.

Turning now to FIG. 4, a process 400 is describe that facilitates generating scores for firewall rules based on numbers of discretely identifiable logical objects that are encompassed within corresponding ranges of Internet Protocol (IP) addresses. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

At operation 401 of the process 400, a system such as, for example, the firewall rule evaluation service receives firewall rule data that defines at least one firewall rule interne protocol (IP) address range. In an exemplary embodiment, the firewall rule data defines a plurality of firewall rules that are designed to govern access to secured computing resources. For example, as described in relation to FIG. 1, a networking firewall may receive network traffic from various client devices that are attempting to access the secured computing resources. As the network traffic is received, the network firewall may grant or deny individual client devices access to the secured computing resources.

At operation 403 of the process 400, the system receives logical object data that defines associations between individual logical objects and individual IP address ranges. The logical object data may include Autonomous System Number (ASN) data that defines multiple network operators that operate specific groups of IP prefixes (i.e., lists of IP addresses) in accordance with specifically defined routing policies. Additionally, or alternatively, the logical object data may further comprise Threat Intelligence (TI) data that is received periodically from one or more TI Resources and that identifies one or more flagged IP addresses.

At operation 405 of the process 400, the system identifies a subset of logical objects (that are identified within the logical object data) that have corresponding IP address ranges that are at least partially encompassed by the firewall rule IP address range. For example, the system may identify a specific set of Autonomous Systems that are operating IP prefixes (e.g., lists of IP addresses assigned out by a Regional Internet Registry) that are at least partially encompassed by the firewall rule IP address range.

At operation 407 of the process 400, the system determines a rule score for the firewall rule based on a number of individual logical objects that are identified at block 405 as being included within the subset. For example, as described above, the system may determine a rule score based on rule score criteria that inversely relates assigned scores to a number of Autonomous Systems operating IP prefixes that are at least partially encompassed by the firewall rule IP address range. In this way, firewall rules having broad firewall rule IP address ranges that span across relatively large numbers of associated ASNs and intelligence flagged IP addresses may be assigned relatively lower scores than other firewall rules having fewer associated ASNs and intelligence flagged IP addresses.

Figure 5:
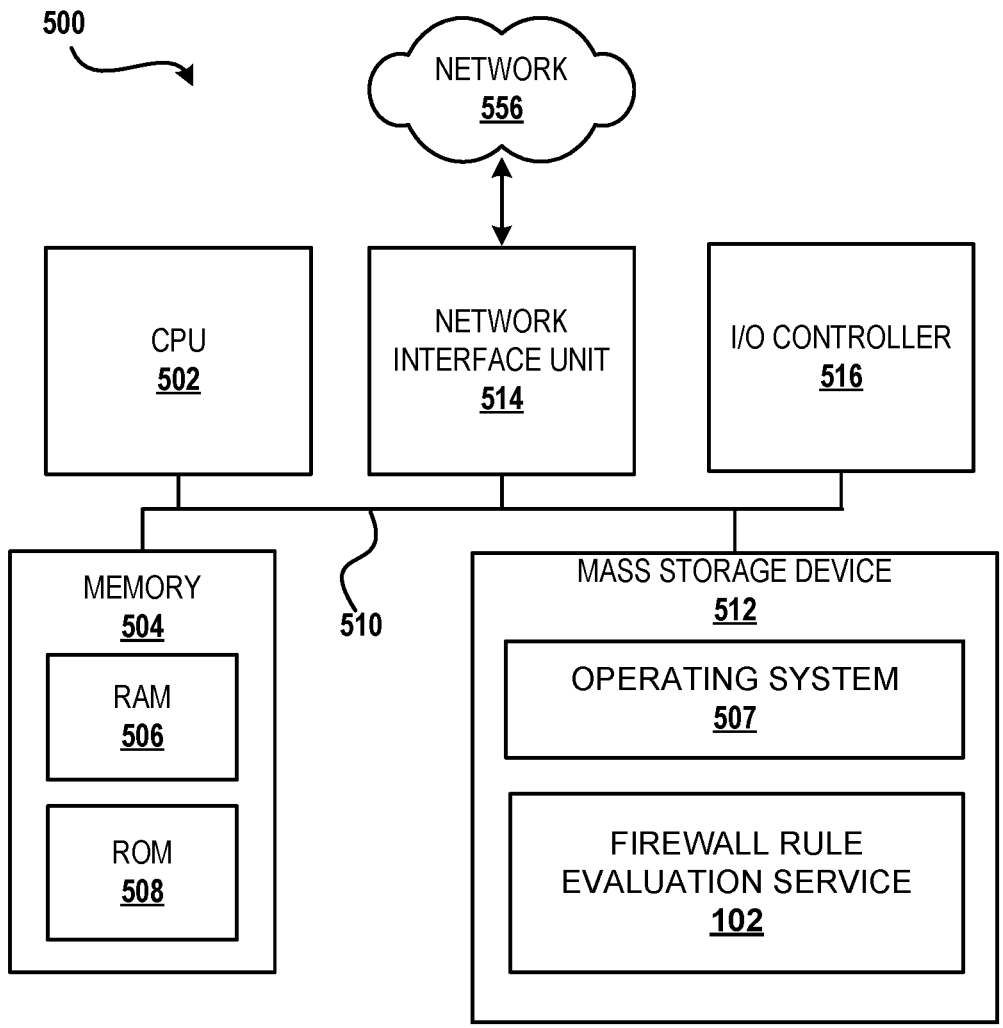
FIG. 5 shows additional details of an example computer architecture for a computer, such as such as a server and/or server cluster, capable of executing the program components described herein.

The FIG. 5 shows additional details of an example computer architecture 500 for a computer, such as such as a server and/or server cluster, capable of executing the program components described herein. Thus, the computer architecture 500 illustrated in FIG. 5 illustrates an architecture for a server computer, a mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, other data, and one or more applications, such as the analysis module 129. The mass storage device 512 can also store computer-executable instruction for implementing the firewall rule evaluation service 102.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes of the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

EXAMPLE CLAUSES

Example 1. A computer-implemented method, comprising: receiving firewall rule data that defines a firewall rule having a firewall rule Internet Protocol (IP) address range that spans from a starting IP address to an ending IP address; receiving Autonomous System Number (ASN) data that defines associations between ASN IP address ranges and corresponding Autonomous Systems, wherein individual Autonomous Systems correspond one or more IP networks that are operating in accordance with individual network routing policies; identifying, based on the firewall rule data and the ASN data, a subset of individual Autonomous Systems having individual ASN IP address ranges that are at least partially encompassed within the firewall rule IP address range for the firewall rule; and determining a rule score for the firewall rule based on a number of Autonomous Systems within the subset of individual Autonomous Systems that are identified as having the individual ASN IP address ranges that are at least partially encompassed within the firewall rule IP address range.

Example 2. The computer-implemented method of example clause 1, wherein the rule score is determined based on firewall rule scoring criteria that inversely relates a range of potential rule scores to numbers of Autonomous Systems having corresponding ASN IP address ranges that are at least partially encompassed within the firewall rule IP address range.

Example 3. The computer-implemented method of example clause 1, further comprising: receiving Threat Intelligence (TI) data that defines a plurality of TI flagged IP addresses; identifying, based on the firewall rule data and the TI data, a subset of individual TI flagged IP addresses that are includes within the firewall rule IP address range for the firewall rule, wherein the rule score for the firewall rule is further determined based on the subset of individual TI flagged IP addresses.

Example 4. The computer-implemented method of example clause 3, wherein the rule score is determined based on firewall rule scoring criteria that inversely relates a range of potential rule scores to numbers of TI flagged IP addresses that are included within the firewall rule IP address range.

Example 5. The computer-implemented method of example clause 1, further comprising: generating a firewall rule scoring chart that graphically represents characteristics of the Autonomous Systems that are identified as having the individual ASN IP address ranges that are at least partially encompassed within the firewall rule IP address range.

Example 6. The computer-implemented method of example clause 5, wherein the firewall rule scoring chart includes: a first axis along which individual ASN ownerships are indicated for the individual Autonomous Systems, and a second axis along which the individual ASN IP address ranges are indicated in association with the individual ASN ownerships.

Example 7. The computer-implemented method of example clause 5, further comprising: converting the firewall rule data and the ASN data from a decimal format to an integer format, wherein an IP Value Axis of the firewall rule scoring chart is graphically represented in accordance with the integer format.

Example 8. The computer-implemented method of example clause 1, further comprising: generating one or more firewall rule recommendations for parsing the firewall rule into one or more other firewall rules that are designed to precisely encompass one or more of the individual ASN IP address ranges.

Example 9. The computer-implemented method of example clause 1, further comprising: generating a firewall rule recommendation that defines an individual firewall rule that is designed to precisely encompass two or more of the individual ASN IP address ranges that correspond to individual Autonomous Systems having a common characteristic.

Example 10. A system comprising: one or more processing units; and a computer-readable storage medium having computer-executable instructions stored thereupon, which, when executed by the one or more processing units, cause the one or more processing units to: receive firewall rule data that defines a firewall rule having a firewall rule Internet Protocol (IP) address range; receive logical object data that defines associations between individual logical objects and at least one of: IP address ranges that span from a starting IP address to an ending IP address, or discrete IP addresses; identify, based on the firewall rule data and the logical object data, a subset of logical objects that are at least partially encompassed within the firewall rule IP address range for the firewall rule; and determine a rule score for the firewall rule based on a number of individual logical objects that are included within the subset of logical objects identified as being at least partially encompassed within the firewall rule IP address range.

Example 11. The system of example clause 10, wherein the logical object data comprises Autonomous System Number (ASN) data that defines associations between ASN IP address ranges and corresponding Autonomous Systems, and wherein the subset of logical objects comprises a subset of Autonomous Systems having individual ASN IP address ranges that are at least partially encompassed within the firewall rule IP address range.

Example 12. The system of example clause 11, wherein the logical object data further comprises Threat Intelligence (TI) data that defines a plurality of TI flagged IP addresses, and wherein the subset of logical objects further comprises a subset of individual TI flagged IP addresses that are includes within the firewall rule IP address range for the firewall rule.

Example 13. The system of example clause 11, wherein the rule score is determined based on firewall rule scoring criteria that inversely relates a range of potential rule scores to numbers of Autonomous Systems having corresponding ASN IP address ranges that are at least partially encompassed within the firewall rule IP address range.

Example 14. The system of example clause 10, wherein the computer-executable instructions further cause the one or more processing units to: generate a firewall rule scoring chart that graphically represents characteristics of the individual logical objects that are included within the subset of logical objects.

Example 15. The system of example clause 14, wherein the firewall rule scoring chart includes an IP value axis that graphically represents at least the firewall IP address range in an integer format, and wherein the individual IP address ranges or the discrete IP addresses are represented in relation to the IP value axis.

Example 16. The system of example clause 10, wherein the computer-executable instructions further cause the one or more processing units to: determine, based on the logical object data, a plurality of ASN IP address ranges that individually correspond to individual Autonomous Systems that are included within the subset of logical objects; and determine, based on the plurality of ASN IP address ranges, one or more firewall rule recommendations.

Example 17. The system of example clause 16, wherein the one or more firewall rule recommendations are designed to generate at least one firewall rule having a corresponding firewall rule IP address range precisely encompasses one or more individual ASN IP address ranges.

Example 18. A computer-implemented method, comprising: receiving firewall rule data that defines a firewall rule Internet Protocol (IP) address range in association with a firewall rule; receiving logical object data that defines associations between individual logical objects and individual IP address ranges that span from a starting IP address to an ending IP address; identifying, based on the firewall rule data and the logical object data, a subset of logical objects having corresponding IP address ranges that are at least partially encompassed within the firewall rule IP address range for the firewall rule; and determining a rule score for the firewall rule based a number of individual logical objects that are included within the subset of logical objects.

Example 19. The computer-implemented method of example clause 18, wherein the logical object data comprises Autonomous System Number (ASN) data that defines associations between ASN IP address ranges and corresponding Autonomous Systems.

Example 20. The computer-implemented method of example clause 19, wherein the subset of logical objects comprises a subset of Autonomous Systems having individual ASN IP address ranges that are at least partially encompassed within the firewall rule IP address range.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:
1. A computer-implemented method, comprising:
receiving firewall rule data that defines a firewall rule having a firewall rule Internet Protocol (IP) address range that spans from a starting IP address to an ending IP address;
receiving Autonomous System Number (ASN) data that defines associations between ASN IP address ranges and corresponding Autonomous Systems, wherein individual Autonomous Systems correspond one or more IP networks that are operating in accordance with individual network routing policies;
identifying, based on the firewall rule data and the ASN data, a subset of individual Autonomous Systems having individual ASN IP address ranges that are at least partially encompassed within the firewall rule IP address range for the firewall rule; and determining a rule score for the firewall rule based on a number of Autonomous Systems within the subset of individual Autonomous Systems that are identified as having the individual ASN IP address ranges that are at least partially encompassed within the firewall rule IP address range.

2. The computer-implemented method of claim 1, wherein the rule score is determined based on firewall rule scoring criteria that inversely relates a range of potential rule scores to numbers of Autonomous Systems having corresponding ASN IP address ranges that are at least partially encompassed within the firewall rule IP address range.

3. The computer-implemented method of claim 1, further comprising:

receiving Threat Intelligence (TI) data that defines a plurality of TI flagged IP addresses;

identifying, based on the firewall rule data and the TI data, a subset of individual TI flagged IP addresses that are includes within the firewall rule IP address range for the firewall rule, wherein the rule score for the firewall rule is further determined based on the subset of individual TI flagged IP addresses.

4. The computer-implemented method of claim 3, wherein the rule score is determined based on firewall rule scoring criteria that inversely relates a range of potential rule scores to numbers of TI flagged IP addresses that are included within the firewall rule IP address range.

5. The computer-implemented method of claim 1, further comprising:

generating a firewall rule scoring chart that graphically represents characteristics of the Autonomous Systems that are identified as having the individual ASN IP address ranges that are at least partially encompassed within the firewall rule IP address range.

6. The computer-implemented method of claim 5, wherein the firewall rule scoring chart includes:

a first axis along which individual ASN ownerships are indicated for the individual Autonomous Systems, and a second axis along which the individual ASN IP address ranges are indicated in association with the individual ASN ownerships.

7. The computer-implemented method of claim 5, further comprising:

converting the firewall rule data and the ASN data from a decimal format to an integer format, wherein an IP Value Axis of the firewall rule scoring chart is graphically represented in accordance with the integer format.

8. The computer-implemented method of claim 1, further comprising:

generating one or more firewall rule recommendations for parsing the firewall rule into one or more other firewall rules that are designed to precisely encompass one or more of the individual ASN IP address ranges.

9. The computer-implemented method of claim 1, further comprising:

generating a firewall rule recommendation that defines an individual firewall rule that is designed to precisely encompass two or more of the individual ASN IP address ranges that correspond to individual Autonomous Systems having a common characteristic.

10. A system comprising:

one or more processing units; and a computer-readable storage medium having computer-executable instructions stored thereupon, which, when executed by the one or more processing units, cause the one or more processing units to:

receive firewall rule data that defines a firewall rule having a firewall rule Internet Protocol (IP) address range;

receive logical object data that defines associations between individual logical objects and at least one of:

IP address ranges that span from a starting IP address to an ending IP address, or discrete IP addresses;

identify, based on the firewall rule data and the logical object data, a subset of logical objects that are at least partially encompassed within the firewall rule IP address range for the firewall rule; and determine a rule score for the firewall rule based on a number of individual logical objects that are included within the subset of logical objects identified as being at least partially encompassed within the firewall rule IP address range.

11. The system of claim 10, wherein the logical object data comprises Autonomous System Number (ASN) data that defines associations between ASN IP address ranges and corresponding Autonomous Systems, and wherein the subset of logical objects comprises a subset of Autonomous Systems having individual ASN IP address ranges that are at least partially encompassed within the firewall rule IP address range.

12. The system of claim 11, wherein the logical object data further comprises Threat Intelligence (TI) data that defines a plurality of TI flagged IP addresses, and wherein the subset of logical objects further comprises a subset of individual TI flagged IP addresses that are includes within the firewall rule IP address range for the firewall rule.

13. The system of claim 11, wherein the rule score is determined based on firewall rule scoring criteria that inversely relates a range of potential rule scores to numbers of Autonomous Systems having corresponding ASN IP address ranges that are at least partially encompassed within the firewall rule IP address range.

14. The system of claim 10, wherein the computer-executable instructions further cause the one or more processing units to:

generate a firewall rule scoring chart that graphically represents characteristics of the individual logical objects that are included within the subset of logical objects.

15. The system of claim 14, wherein the firewall rule scoring chart includes an IP value axis that graphically represents at least the firewall IP address range in an integer format, and wherein the individual IP address ranges or the discrete IP addresses are represented in relation to the IP value axis.

16. The system of claim 10, wherein the computer-executable instructions further cause the one or more processing units to:

determine, based on the logical object data, a plurality of ASN IP address ranges that individually correspond to individual Autonomous Systems that are included within the subset of logical objects; and determine, based on the plurality of ASN IP address ranges, one or more firewall rule recommendations.

17. The system of claim 16, wherein the one or more firewall rule recommendations are designed to generate at least one firewall rule having a corresponding firewall rule IP address range precisely encompasses one or more individual ASN IP address ranges.

18. A computer-implemented method, comprising:
- receiving firewall rule data that defines a firewall rule Internet Protocol (IP) address range in association with a firewall rule;
- receiving logical object data that defines associations between individual logical objects and individual IP address ranges that span from a starting IP address to an ending IP address;
- identifying, based on the firewall rule data and the logical object data, a subset of logical objects having corresponding IP address ranges that are at least partially encompassed within the firewall rule IP address range for the firewall rule; and
- determining a rule score for the firewall rule based a number of individual logical objects that are included within the subset of logical objects.

19. The computer-implemented method of claim 18, wherein the logical object data comprises Autonomous System Number (ASN) data that defines associations between ASN IP address ranges and corresponding Autonomous Systems.

20. The computer-implemented method of claim 19, wherein the subset of logical objects comprises a subset of Autonomous Systems having individual ASN IP address ranges that are at least partially encompassed within the firewall rule IP address range.

* * * * *